Roberts & Throp.
Horse Power.
N° 92,473. Patented Jul. 13, 1869.

Sheet 2.
2 Sheets.

Witnesses;
John P. Chew
Jo A Keyler

Inventors;
Cyrus Roberts & Jno A Throp
pr J Snowden Bell
Atty

United States Patent Office.

CYRUS ROBERTS AND JOHN A. THROP, OF THREE RIVERS, MICHIGAN.

Letters Patent No. 92,473, dated July 13, 1869.

IMPROVED HORSE-POWER.

The Schedule referred to in these Letters Patent and making part of the same.

*To all whom it may concern:*

Be it known that we, CYRUS ROBERTS and JOHN A. THROP, of Three Rivers, in the county of St. Joseph, and State of Michigan, have invented certain new and useful Improvements in Horse-Powers, of which the following is a full, clear, and exact description, reference being had to the accompanying drawings, which make part of this specification, and in which—

Figure 1:
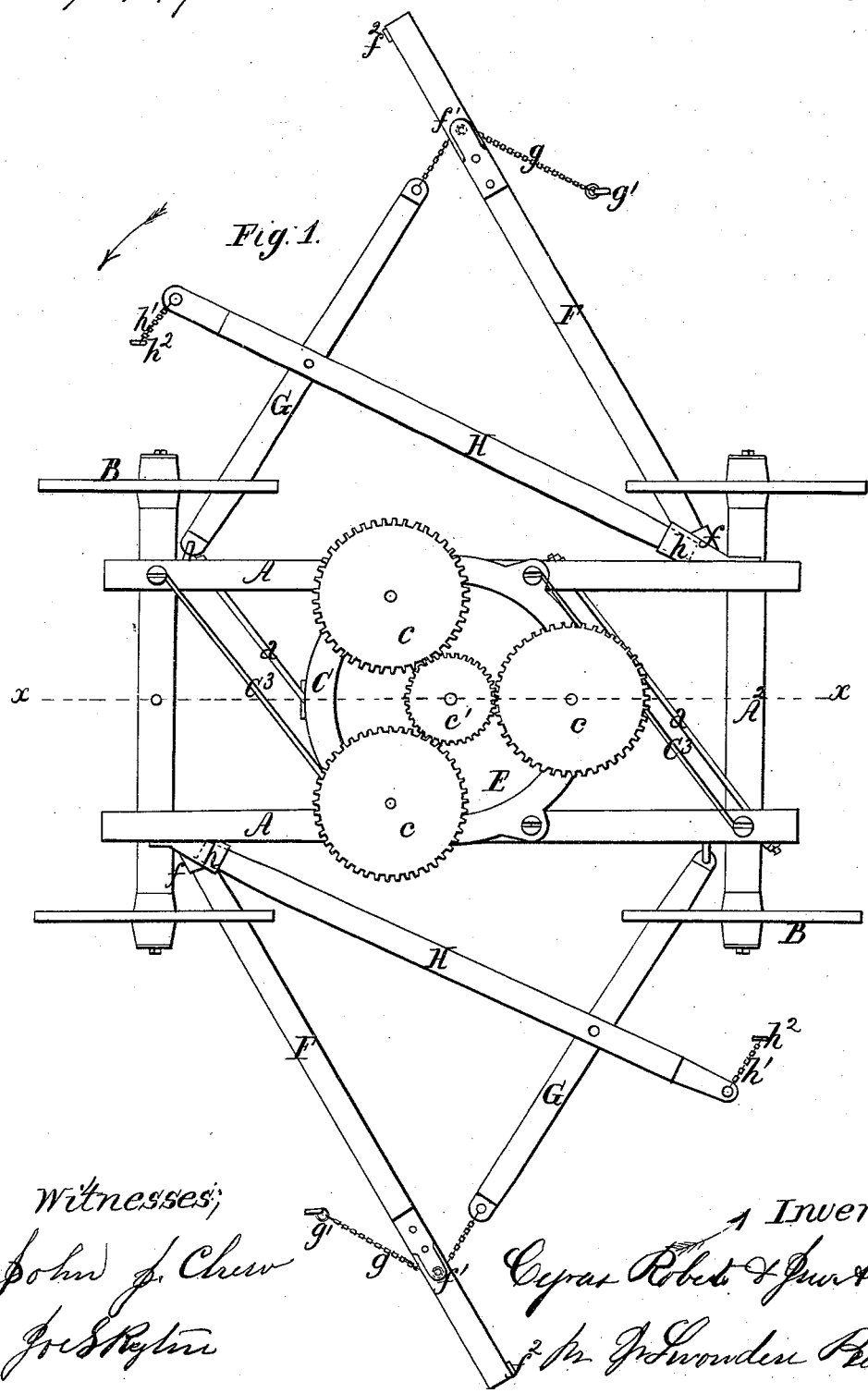
Figure 2:
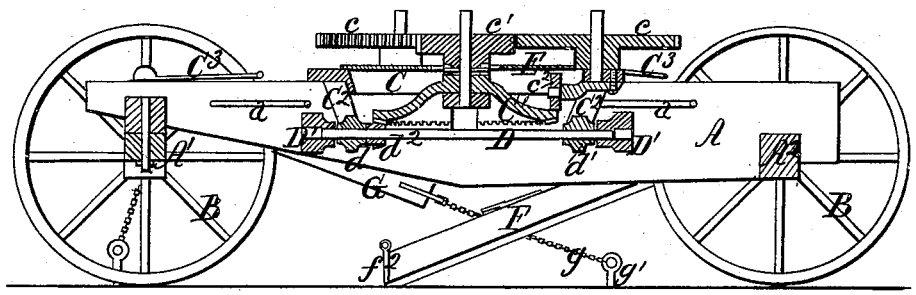
Figure 3:
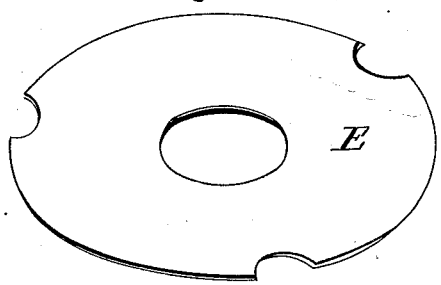

Figure 1 represents a plan or top view of our improved horse-power;

Figure 2, a vertical longitudinal section of the same, at the line $x\ x$ of fig. 1;

Figure 3, a view, in perspective, of the grease-plate detached; and

Figure 4:
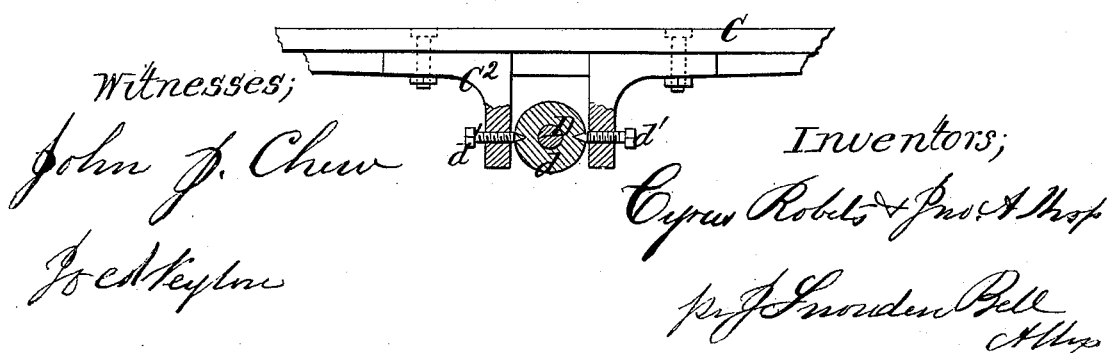

Figure 4, an end view, partly in elevation and partly in section, of one of the hangers of the line-shaft.

The improvements herein claimed consist—

First, in the arrangement of a grease-plate or shield upon the bed-plate, below the first series of gears, by which the horse-power is driven, and above the bevel-wheel, which gears with the pinion upon the line-shaft, whereby the said bevel-wheel is protected from grease and other foreign matters, which, falling upon it, would cause its roller to slip or stop, instead of revolving, and to wear flat places upon its upper surface.

Second, in arranging a line-shaft longitudinally upon the machine, the same being supported in boxes pivoted to open hangers below the bed-plate, and provided with suitable attachments for tumbling-rods at one or both of its ends, whereby the said line-shaft can be readily removed and replaced, for purposes of renewal or repair, the gears maintained truly in line, and connections conveniently made to the machinery to be driven, the longitudinal position of the line-shaft enabling the horse-power to be adjusted in relation to the said machinery, by drawing it forward or backward, instead of lifting it laterally, as would be required if a transverse line-shaft were employed.

Third, in a novel combination of braces for securing the machine to the ground when in operation, in which a thrust-brace, a tension-brace, and a holding-down brace are employed, and operate conjointly to prevent displacement of the machine, as hereinafter more fully set forth.

In the accompanying drawings, which show a convenient arrangement of parts for carrying out the objects of our invention—

A represents the frame of the machine, which is mounted upon the front and rear axles $A^1\ A^2$, carrying wheels B, for the purpose of facilitating transportation from place to place, the front axle being pivoted upon a centre-pin, so as to turn in either direction.

An annular metallic bed-plate, C, firmly secured to the frame by bolts, and also by diagonal braces $C^3$, arranged in the line of strain exerted by the horses in operating the horse-power, supports the gearing by which the same is driven.

The master-wheel, to which the horses are connected, by means of levers of suitable length, and which, not being included in the improvements herein claimed, is not shown in the drawings, is provided with internal gearing, which engages spur-wheels $c$, revolving upon short vertical shafts secured to the bed-plate C.

The spur-wheels $c$, in turn, gear into a pinion, $c^1$, which revolves upon a central shaft secured to a transverse brace beneath the bed-plate, and is coupled to a dished bevel-wheel $C^1$, in such manner that the two shall rotate together.

A line-shaft, D, is arranged longitudinally beneath the bed-plate, at the centre line of the machine, and carries a bevel-pinion, $d^2$, into which the bevel-wheel $C^1$ gears, to impart revolution to the line-shaft.

The bevel-wheel $C^1$ and spur-pinion $c^1$ are prevented from sagging or working out of line, by a friction-roller, $c^2$, which rotates upon an arm secured to the lower side of the bed-plate, and bears upon the upper surface of the bevel-wheel at a point opposite to the pinion $d^2$.

A grease-plate or shield, E, rests upon the top of the bed-plate, having a central opening and recesses in its periphery, to enable it to clear the gears $c\ c^1$.

This plate effectually prevents the entrance of grease, dust, or other foreign matters to the bevel-wheel, thereby insuring the proper action of the friction-roller $c^2$, which, if the upper surface of the bevel-wheel were allowed to become greasy, would slip or stop, instead of rotating, and wear the same unevenly.

The line-shaft D is mounted in bearings $d$, which are pivoted, by the pivot-screws $d^1$, to hangers $C^2$, which are entirely open at bottom, and are cast in a piece with or secured to the lower side of the bed-plate.

Couplings $D^1$ are secured upon the ends of the line-shaft, to one or each of which a tumbling-rod can be connected, and rotated at a desired angle to drive the machinery to be operated.

By this arrangement, it will be seen that the gearing can be kept in line by means of proper adjustment of the pivoted boxes, and the open hangers allow the line-shaft to be quickly and easily removed when desired.

The longitudinal position of the line-shaft enables power to be communicated to machinery at one or both ends of the machine in line therewith, so that its position, in relation to the machinery to be driven, can be readily adjusted, by moving it forward or backward upon its wheels, instead of requiring to be lifted laterally, as would be the case if the shaft extended out from its sides.

The frame A is strengthened by diagonal braces $a$, arranged in the line of strain exerted by the horses, similarly to the bed-plate braces $C^3$.

In order to firmly secure the machine to the ground, when in operation, we employ the following devices, whereby, upon each side of the machine, a tension-brace, a thrust-brace, and a holding-down brace, act conjointly to that end.

Sockets $f$ are secured upon the opposite sides of the frame, contiguous to the front and rear axles, respectively, in which are inserted braces F, extending in the direction of the movement of the horses, as shown by the arrows in fig. 1, and having their opposite ends bearing against stakes $f^2$, firmly driven into the ground.

Braces G are hooked to rings or staples upon the frame, at opposite ends to the braces F, and extending in reverse direction thereto, are connected by chains $g$ passing around rollers or pins $f^1$, on the braces F, to stakes $g^1$, driven into the ground upon opposite sides of the braces to the stakes $f^2$.

Sockets $h$ are secured to the frame above the sockets $f$, in which are inserted the braces H, which extend in similar direction to the braces F, but at a less angle with the frame, and which, crossing the braces G, to which they may be connected by a pin or link, are secured by chains $h^1$ to stakes $h^2$.

When the machine is in operation, the strain, induced by the movements of the horses, tends to bear the braces F against the stakes $f^2$, and to pull upon the stakes $g^1$, through the braces G and chains $g$, thereby causing the braces F to resist a thrusting-strain and the braces G, a tensile strain.

The tendency which is developed to raise the corners of the frame, to which the braces G are connected, is resisted by the holding-down braces H, and it will thus be seen, that the three braces on each side of the machine, each performing its respective function, act in unison to prevent the displacement thereof.

What we claim as new, and desire to secure by Letters Patent, is—

1. The arrangement of the grease-plate E upon the bed-plate, between the upper gears and bevel-wheel, substantially as and for the purpose set forth.

2. The combination of the frame, the bed-plate, the bevel-wheel, and the hangers, with the longitudinal line-shaft and its pinion, all constructed and arranged as set forth, for joint operation.

3. The pivoted boxes $d$, in combination with the line-shaft D and bevel-wheels $C^1$ $d^2$, substantially as and for the purpose set forth.

4. The combination, as set forth, of the bed-plate, the open-bottomed hangers, and the pivoted boxes, with the line-shaft, all these parts being constructed for joint operation, as described.

5. The combination of the thrust-brace F, the tension-brace G, and the holding-down brace H, intersecting the thrust-brace, all constructed for joint operation, substantially as set forth.

CYRUS ROBERTS.
JOHN A. THROP.

Witnesses:
JAS. H. LYON,
C. W. HICKS.